(12) United States Patent
Pendergast et al.

(10) Patent No.: US 9,417,756 B2
(45) Date of Patent: Aug. 16, 2016

(54) VIEWING AND EDITING MEDIA CONTENT

(71) Applicant: Apple Inc., Cupertino, CA (US)

(72) Inventors: Colleen M. Pendergast, Livermore, CA (US); James J. Hodges, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 283 days.

(21) Appl. No.: 13/656,349

(22) Filed: Oct. 19, 2012

(65) Prior Publication Data

US 2014/0115477 A1   Apr. 24, 2014

(51) Int. Cl.
*G06F 3/048* (2013.01)
*G06F 3/0484* (2013.01)

(52) U.S. Cl.
CPC ............ *G06F 3/048* (2013.01); *G06F 3/04842* (2013.01)

(58) Field of Classification Search
USPC ....................................................... 715/723
See application file for complete search history.

(56) References Cited

U.S. PATENT DOCUMENTS

| | | | |
|---|---|---|---|
| 5,781,188 A * | 7/1998 | Amiot et al. | 715/723 |
| 8,073,208 B2 | 12/2011 | Jeong et al. | |
| 8,117,206 B2 | 2/2012 | Sibley et al. | |
| 8,276,074 B2 | 9/2012 | Ubillos | |
| 8,543,918 B2 | 9/2013 | Margulis | |
| 2002/0133486 A1 | 9/2002 | Yanagihara et al. | |
| 2007/0098268 A1 | 5/2007 | Beresford | |
| 2008/0155421 A1* | 6/2008 | Ubillos et al. | 715/724 |
| 2008/0155459 A1* | 6/2008 | Ubillos | 715/783 |
| 2010/0183280 A1 | 7/2010 | Beauregard et al. | |
| 2013/0263003 A1 | 10/2013 | Joseph et al. | |

FOREIGN PATENT DOCUMENTS

GB    2 387 710    10/2003

* cited by examiner

*Primary Examiner* — Matthew Ell
(74) *Attorney, Agent, or Firm* — Fish & Richardson P.C.

(57) ABSTRACT

Among other things, a method includes displaying, in a user interface of a video editing application, an interface enabling a user of the video editing application to mark ranges in video clips presented in the user interface, the ranges of the video clips each representing a portion of video content of each respective clip, and at least some of the ranges of the video clips being displayed as marked simultaneously, receiving, from the user, a selection of multiple marked ranges of video clips, and establishing a relationship between the selected multiple ranges of the video clips.

25 Claims, 13 Drawing Sheets

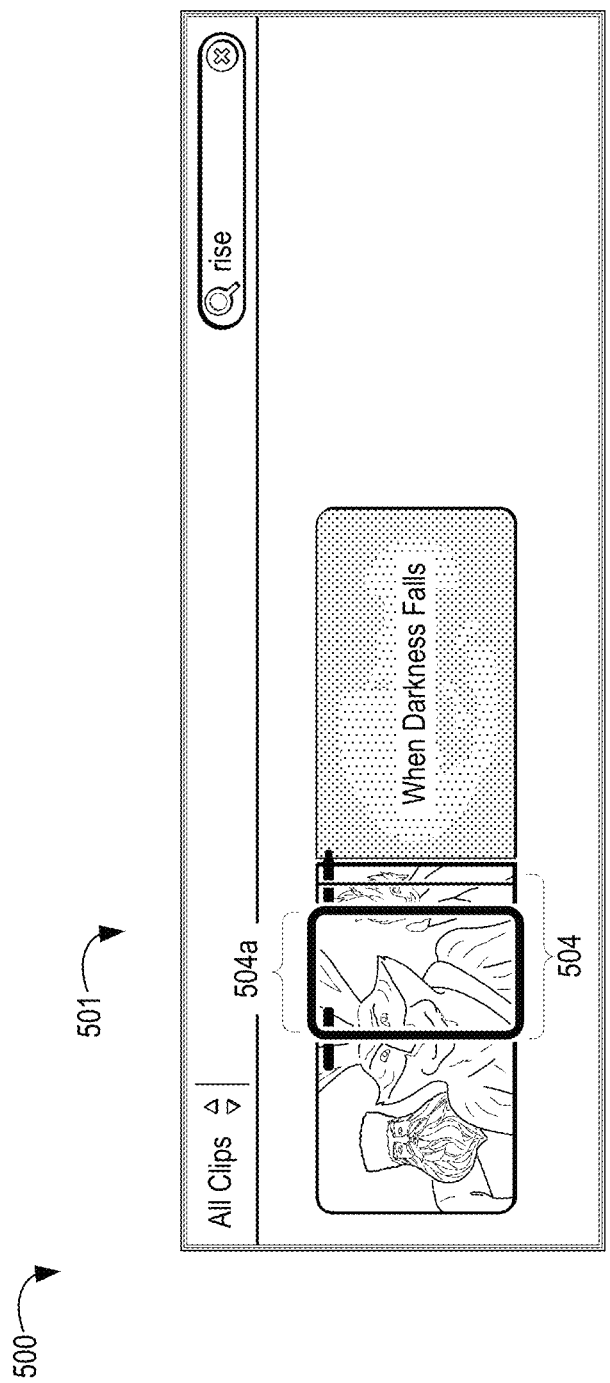

VIEWING AND EDITING MEDIA CONTENT

TECHNICAL FIELD

The disclosure generally relates to viewing and editing media content.

BACKGROUND

Media content can be manipulated in a media authoring application. For example, media content containing video can be represented as video clips each including a portion of video content (frames of video, associated audio, and/or metadata). Each of the video clips can be accessed in a user interface, for example, to view the video clip, modify the video clip, or incorporate the video clip into a project.

SUMMARY

In one aspect, in general, a method includes displaying, in a user interface of a video editing application, an interface enabling a user of the video editing application to mark ranges in video clips presented in the user interface, the ranges of the video clips each representing a portion of video content of each respective clip, and at least some of the ranges of the video clips being displayed as marked simultaneously, receiving, from the user, a selection of multiple marked ranges of video clips, and establishing a relationship between the selected multiple ranges of the video clips.

Implementations may include one or more of the following features. At least some of the selected multiple ranges of video clips are portions of the same video clip. At least some of the selected multiple ranges of video clips are portions of different video clips. Establishing a relationship between the selected multiple ranges of the video clips includes saving data representing the selection. Establishing a relationship between the selected multiple ranges of the video clips includes assigning a category to the selected multiple ranges of the video clips. Receiving, from the user, a selection of multiple ranges of video clips includes receiving a selection of a subset of the ranges of video clips marked in the user interface. The subset of the ranges of video clips marked in the user interface are displayed as active, and at least some of the ranges of video clips marked in the user interface not in the subset are displayed as not active. A first portion of a first marked range of a video clip overlaps with a first range of a video clip having an assignment to a first category in the user interface, and a second portion of the first marked range of the video clip overlaps with a second range of a video clip having an assignment to a second category in the user interface. In response to receiving a command to display video clips assigned to the first category, a second marked range is displayed in the user interface corresponding to the first portion of the first marked range of the video clip. Subsequent to receiving a command to deactivate the second marked range corresponding to the first portion of the marked range of the video clip, it is determined whether to modify the first marked range of the video clip.

Other aspects may include corresponding systems, apparatus, or computer readable media.

Details of one or more implementations are set forth in the accompanying drawings and the description below. Other features, aspects, and potential advantages will be apparent from the description and drawings, and from the claims.

DESCRIPTION OF DRAWINGS

FIGS. 5A-5G show portions of a user interface.

Like reference symbols in the various drawings indicate like elements.

DETAILED DESCRIPTION

Video editing software enables a user to manipulate video clips. For example, the user can mark a range within a video clip (e.g., mark the first ten seconds of a twenty second video clip) and then incorporate that range into a video project. Sometimes, users may want to perform an action on multiple ranges at the same time. The interface of the video editing software can be designed to allow the user to mark multiple ranges of video clips and then establish a relationship between the ranges. For example, the marking of the multiple ranges can be saved, so that later the ranges can be recalled and manipulated (e.g., incorporated into a video project). The marked ranges could also be assigned a category (e.g., "favorite," "rejected"). Some of ranges could be marked within the same video clip (including some of which that overlap) and some of the ranges could be marked within different video clips.

Further, the user can select only some of the marked ranges for establishing a relationship. For example, the user may have marked five ranges, and then the user can select three of them and establish a relationship between the three (e.g., designating the combination of the three as a "favorite").

Also, sometimes the user interface can filter certain ranges of video clips based on a category. For example, one range of a video clip could be assigned a category of "rejected." Another range of a video clip marked by a user could overlap with a range marked "rejected." If the user chooses to only view the ranges not categorized as "rejected," the user interface could display the portion of the marked range not categorized as "rejected" and not display the portion of the marked range categorized as "rejected." Ranges could also be assigned keywords, e.g., keywords describing their content. For example, a range of video content representing a video of a sunset could be assigned the keyword "sunset" by the user.

These same techniques could be used with media other than video. For example, audio editing software could display visual representations of audio clips, and the audio editing software could enable a user to mark ranges of audio clips.

Figure 1:
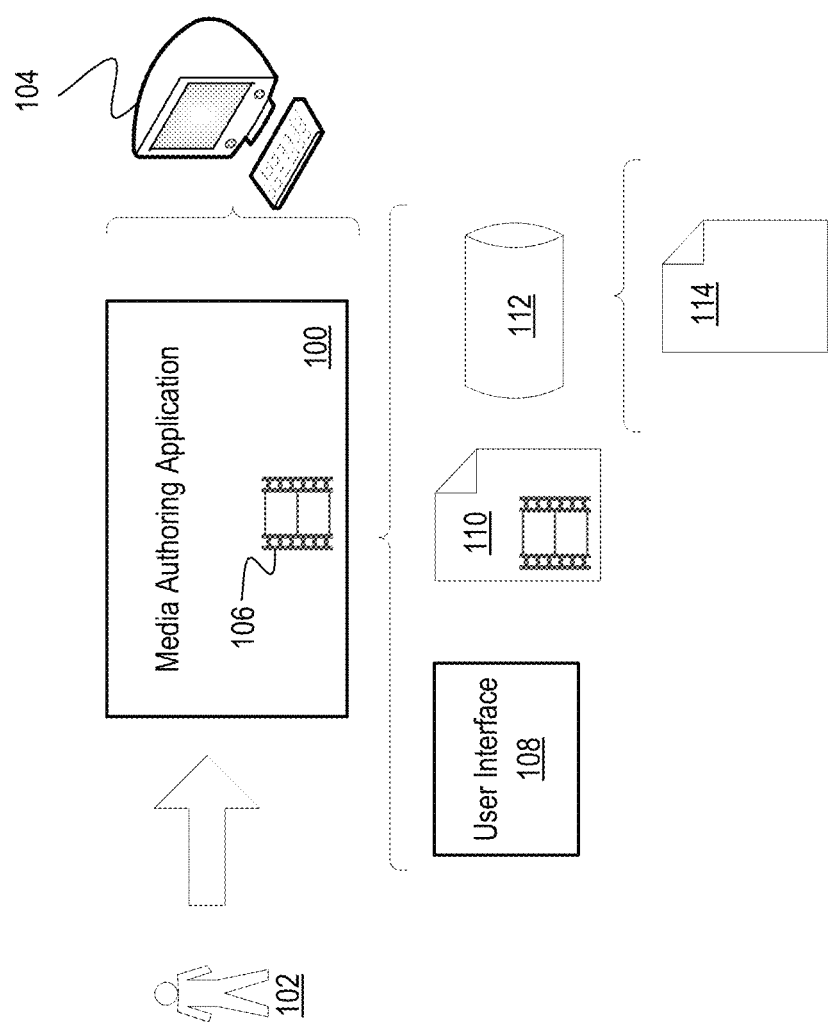
FIG. 1 shows a video editing application being operated by a user of a computer system.

FIG. 1 shows a video editing application 100 being operated by a user 102 of a computer system 104. The video editing application 100 enables the user 102 to view and edit video clips 106 in a user interface 108. In some examples, the video editing application 100 enables the user to use portions of the video clips 106 in a video project 110. A video project 110 is a compilation of video clips, generally arranged by a user to form a coherent theme. For example, a video project 110 could be a feature film, a television show, an interactive multimedia project, or other compilation of media.

The video clips 106 may be stored in association with a database 112, which also may include information about the video clips 106. For example, the database 112 may store metadata 114 indicating how a particular video clip has been manipulated in the user interface 108. If a portion of a video clip 106 has been marked, selected, or categorized, the metadata 114 can include this information.

In some implementations, a video clip 106 contains media content such as video content (e.g., a series of video frames) and audio content. In some examples, a video clip 106 contains only video data, or contains only audio data (e.g., an audio clip). A video clip 106 sometimes takes the form of a data file stored on a storage medium, but a video clip 106 could also take other forms. In some examples, a video clip 106 could be a filtered portion of a media file. In some examples, a video clip 106 could be a "compound clip" that includes multiple clips. In some examples, a video clip 106 could be a "multicam clip" that includes multiple clips from different sources (e.g., different cameras or other recording devices) that are synchronized.

Figure 2:
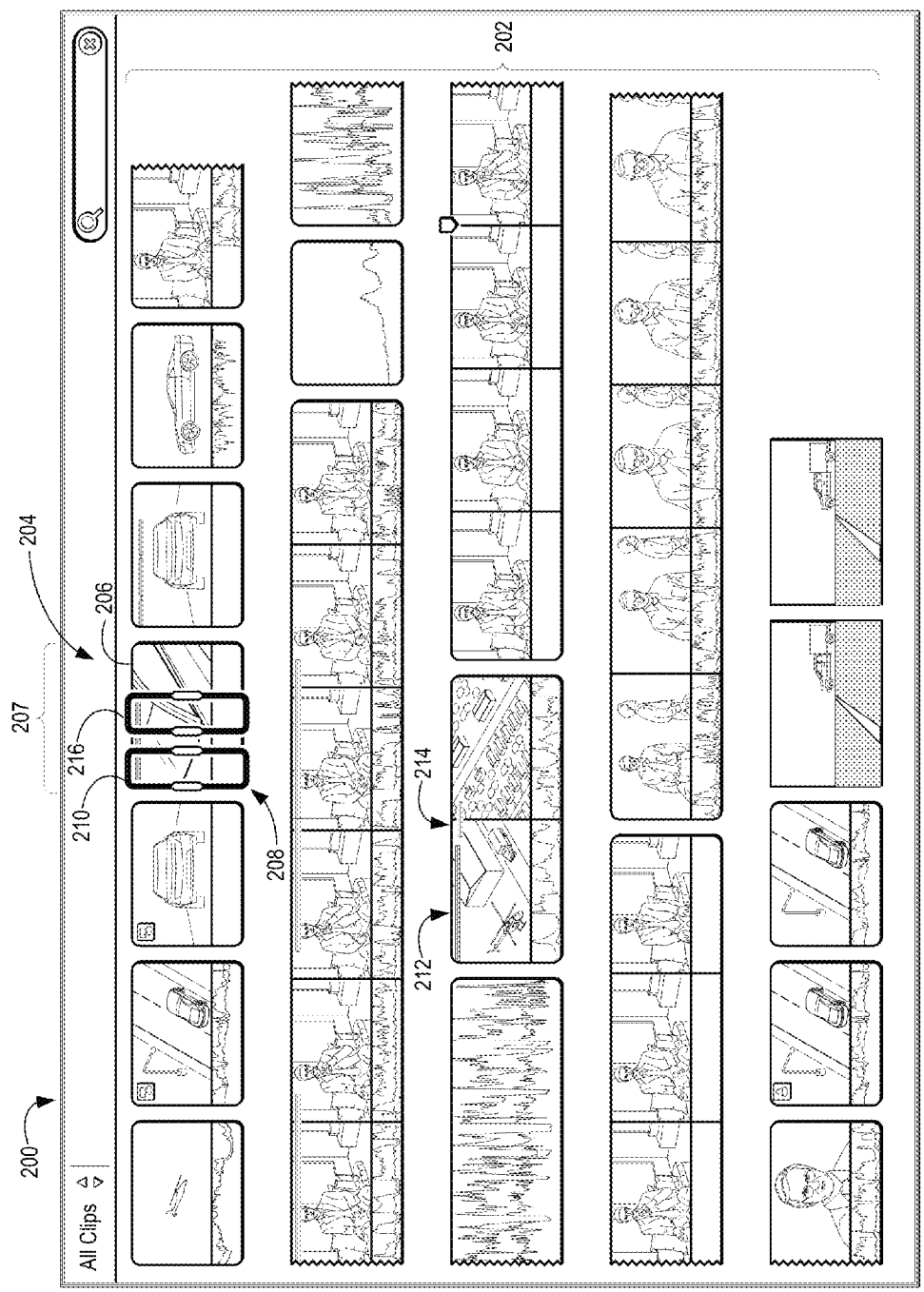
FIG. 2 shows a view of a user interface.

FIG. 2 shows a view of a user interface 200. This user interface 200 could be an example of the user interface 108 shown in FIG. 1. The user interface 200 enables a user to view and edit video clips 202. For example, a user (e.g., the user 102 shown in FIG. 1) can use the user interface 200 to select portions of the video clips 202 to be included in a video project 110 (FIG. 1). A user may use an input device such as a mouse, trackpad, touchscreen, keyboard, or other input device to indicate a portion of a particular video clip 204, e.g., a portion of an icon 206 representing the video clip 204. In some implementations, the icon 206 is generated based on frames of the video clip 204. For example, the icon 206 can contain one or more still images of frames selected from the video content of the video clip 204. The width 207 of the icon 206 is proportional to the running time of the video content of the video clip 204, so that a video clip 204 having a longer running time (e.g., two minutes) is wider than a video clip having a shorter running time (e.g., one minute).

In some examples, the user interface 200 displays an icon 206 that represents something other than a video clip 204. For example, the user interface 200 may display at least one icon 206 that represents a placeholder for future media content. The placeholder may represent a source of media content, for example, a source such as a media input device (e.g., video camera), or a source such as an external software application that provides content to the video editing application 100. The placeholder may also represent no media content, such that the user may later remove the placeholder and manually replace it with other media content such as a video clip.

As shown in the figure, the portion of the video clip 204 is represented as a box 208. The user can "draw" the box 208 over the icon 206 using an input device to indicate the portion of the video clip 204 the user intends to manipulate. This process can be referred to as "marking" a portion of the video clip 204, and the portion of the video clip 204 shown in the user interface 200 as within the box 208 can be referred to as a "marked portion." A portion of a video clip can also be referred to as a range, and so another term for a marked portion is a "marked range." Data describing which ranges are marked can be stored in metadata associated with the video clips (e.g., the metadata 114 shown in FIG. 1).

In some implementations, in addition to enabling a user to draw a box 208 to mark a range, the user interface 200 may enable a user to mark a range during playback of a video clip 204. For example, the user may play the video clip and provide an input (e.g., click a button or press a key on a keyboard) at a particular point in playback to indicate the point in time at which the range begins, and provide a second input A marked range 210 can be manipulated by a user of the user interface 200. For example, a user can choose a marked range 210 of a video clip (as opposed to the entire video clip) for inclusion in a video project. As another example, the user can assign a category to the marked range 210. In some implementations, the video editing application displaying the user interface 200 supports categories that can be assigned to portions of video clips. For example, the categories could include "favorite," which can be assigned to ranges of video clips to be included in a favorites list that provides a user with quick access to those ranges. The categories could also include "rejected," which can be assigned to ranges of video clips that the user does not intend to incorporate into a video project. In some implementations, the user interface 200 enables a user to hide ranges of video clips designated as "rejected." A user could also assign a keyword to ranges of video clips. In some implementations, the user interface 200 enables a user to show or hide ranges of video clips assigned a particular keyword. In some implementations, data indicating which ranges have been categorized (or assigned particular keywords) can be stored, e.g., stored in the database 112 shown in FIG. 1.

Categorized ranges of video clips can be shown in the user interface 200. For example, the user interface 200 may display a bar 212 representing a range of a video clip that has been categorized as "favorite," and a different bar 214 representing a portion of a video clip that has been categorized as "rejected."

This user interface 200 enables a user to mark multiple ranges. In the example shown, a video clip 204 has two marked ranges 210, 216. The marked ranges 210, 216 can be displayed simultaneously, as shown in the figure. The marked ranges 210, 216 can be manipulated simultaneously. For example, a user can establish the marked ranges 210, 216 and simultaneously assign a category to the portions of video represented by the marked ranges 210, 216. In this way, a user need not establish a marked range, assign a category to the first marked range, then establish a second marked range, and assign the category to the second marked range.

In some implementations, the video editing application 100 (FIG. 1) automatically saves multiple marked ranges in association with one another. For example, the video editing application 100 can store metadata 114 (FIG. 1) indicating that the marked ranges 210, 216 were marked at the same time. In some examples, a user can indicate to the video editing application 100 to save the marked ranges 210, 216 in association with one another, so that the user can later recall the marked ranges 210, 216 simultaneously in the user interface 200 (e.g., without having to first indicate to the user interface 200 to recall the first marked range 210 and then having to indicate to the user interface 200 to recall the second marked range 216).

In some implementations, the user interface 200 may enable a user to add ranges to a video project 110 (FIG. 1). For example, a user can use the user interface 200 to choose ranges of interest to the user, and then the user can add those ranges to the video project 110. In the example shown in FIG. 2, the user could take a single action (e.g., provide a single input) in the user interface to add the marked ranges 210, 216 to a video project. In some implementations, the user could drag the marked ranges 210, 216 to a visual representation of the video project 110 displayed in the user interface 200. For example, if the user were to use an input device such as a mouse or touch input to invoke (e.g., click on) one of the marked ranges 210 and drag the marked range 210 to the visual representation of the video project 110, thus adding the marked range 210 to the video project 110, then the other marked range 216 would be added simultaneously without further input from the user.

Figure 3:
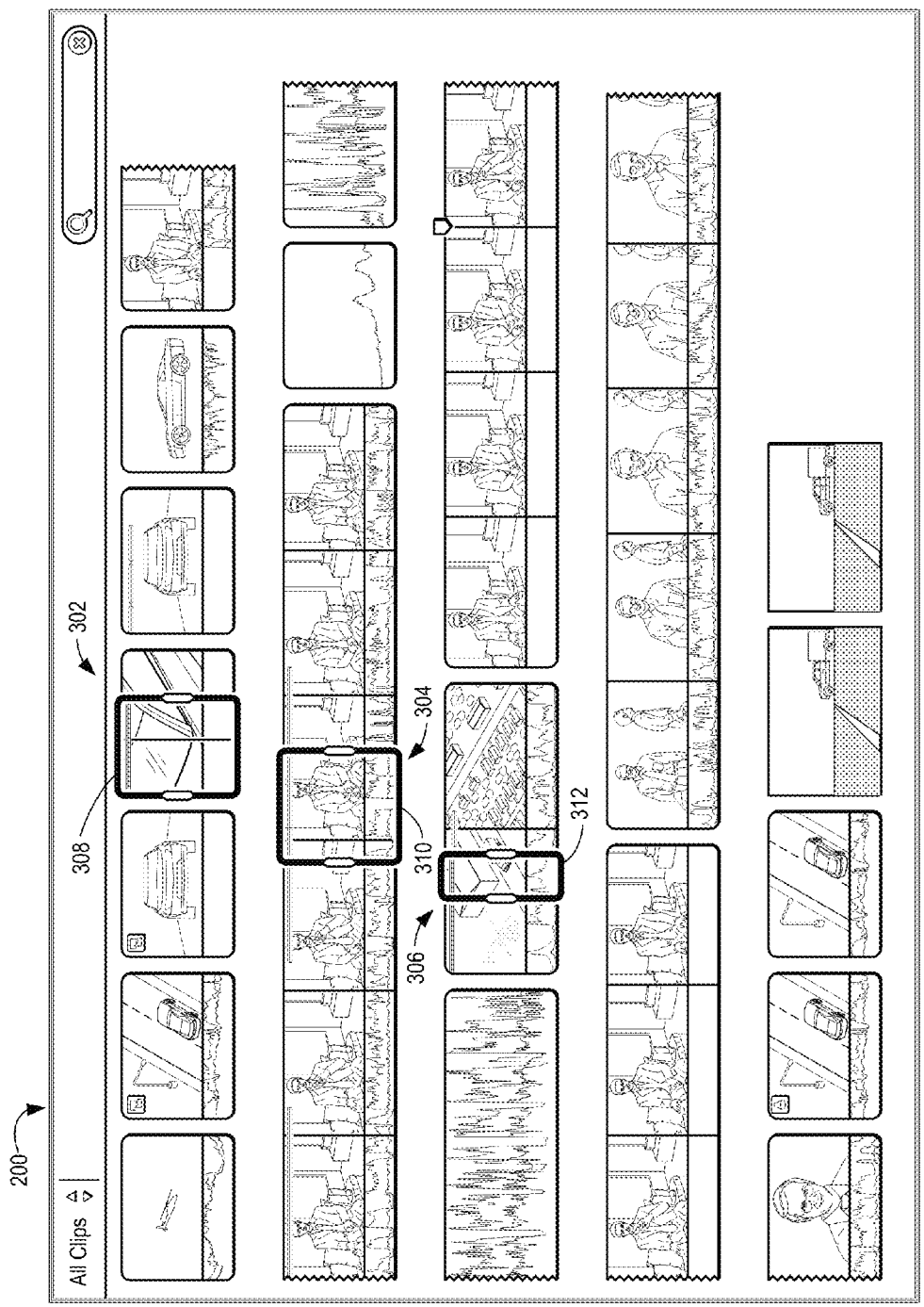
FIG. 3 shows another view of the user interface.

FIG. 3 shows another view of the user interface 200. The user interface 200 enables a user to establish marked ranges for multiple video clips and manipulate those marked ranges simultaneously. For example, three video clips 302, 304, 306 each have respective marked ranges 308, 310, 312. In this way, a user can establish multiple marked ranges within a single video clip, or multiple marked ranges within multiple video clips, or both. All of the marked ranges established by the user can be displayed simultaneously and acted upon simultaneously, e.g., assigned a category, or assigned a keyword, or added to a video project 110 (FIG. 1).

Figure 4:
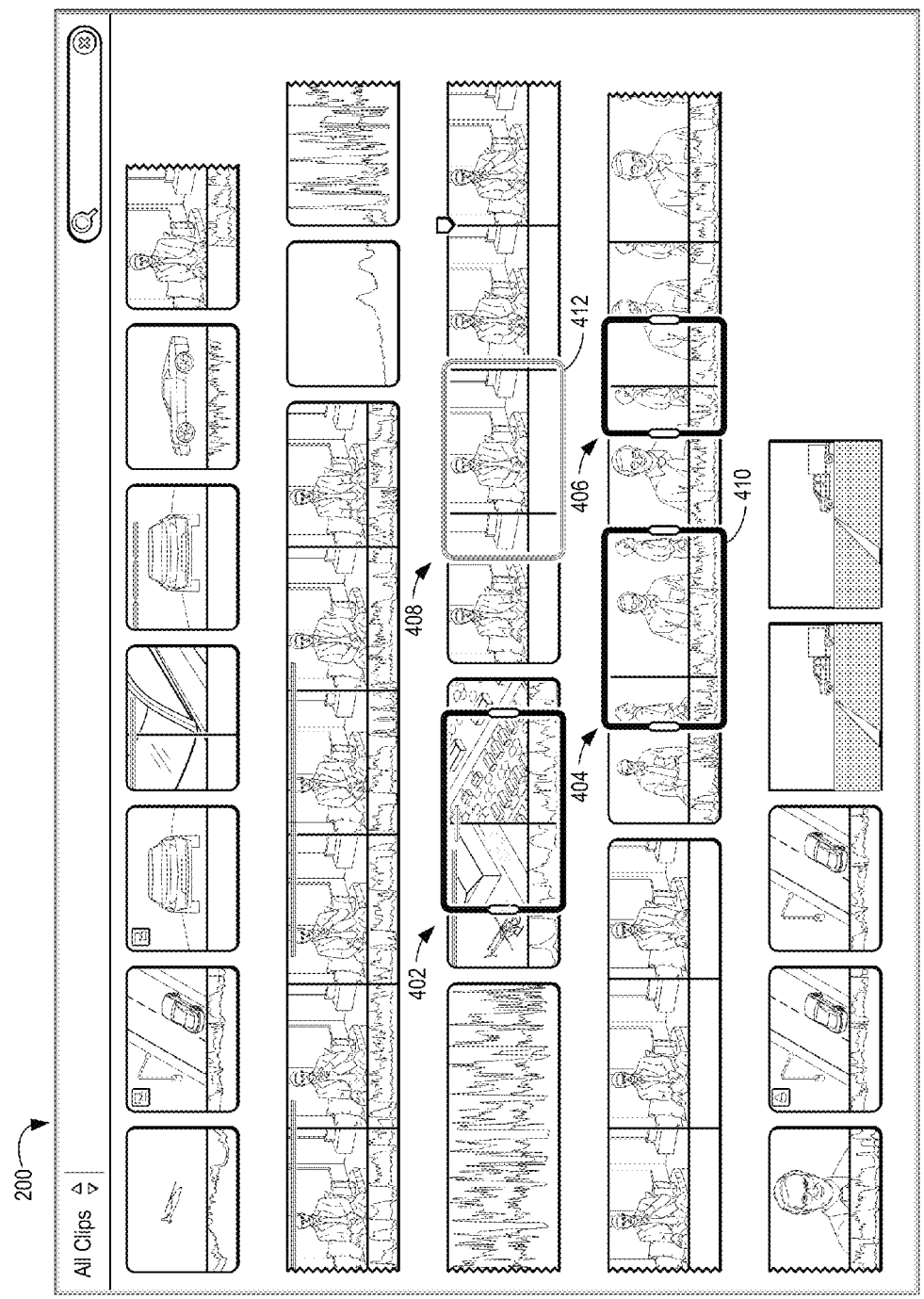
FIG. 4 shows a view of the user interface in which some marked ranges are active and some marked ranges are inactive.

FIG. 4 shows a view of the user interface 200 in which some marked ranges are active and some marked ranges are inactive. The user interface 200 enables a user to select or de-select marked ranges, e.g., by using an input device to select or de-select the marked ranges. A marked range that is selected is referred to as active, and a marked range that is de-selected is referred to as inactive.

In the example shown, three marked ranges 402, 404, 406 are active, and one marked range 408 is inactive. The marked ranges 402, 404, 406 that are active are displayed using one kind of box 410 indicating that they are selected, and the marked range 408 that is inactive is displayed using another kind of box 412 indicating that it is inactive.

A user can manipulate marked ranges that are active, e.g., assign the marked ranges to a category. Any marked range that is inactive will not be affected by the action a user takes. Thus, in this example, if a user takes action to assign a category to marked ranges, only the marked ranges 402, 404, 406 that are active will be assigned the category. In this way, a relationship can be established between the marked ranges 402, 404, 406 that are active.

A user can select or de-select any combination of the marked ranges displayed in the user interface. For example, a user could perform an action on the marked ranges 402, 404, 406 that are active, e.g., assign a category of "favorite." The user could then de-select the marked ranges 402, 404, 406, and select the other marked range 408. The user could then perform an action on that marked range 408, e.g., assign a category of "rejected."

In this way, a user can establish marked ranges 402, 404, 406, 408 each indicating a portion of video of interest to the user, e.g., a portion of video which the user intends to manipulate in the user interface 200. A user need not manipulate the marked ranges immediately after they are established, but could instead de-activate any marked range and return to the marked range later to perform an action. Referring to FIG. 1, data describing the marked range can be stored in the database 112 of the video editing application 100 (e.g. as metadata 114). In this way, a user could even close the video editing application 100 and open the video editing application 100 at a later time to manipulate the marked ranges previously established by the user.

FIGS. 5A-5G show portions of a user interface 500. This user interface 500 could be a version of the user interface 200 shown in FIGS. 2-4. In the examples shown in the figure, a user is manipulating video clips by marking ranges of the video clips, some of which overlap with categorized ranges. As the user shows or hides categorized ranges, the marked ranges are adapted by the user interface 500 based on the views presented to the user.

Figure 5A:
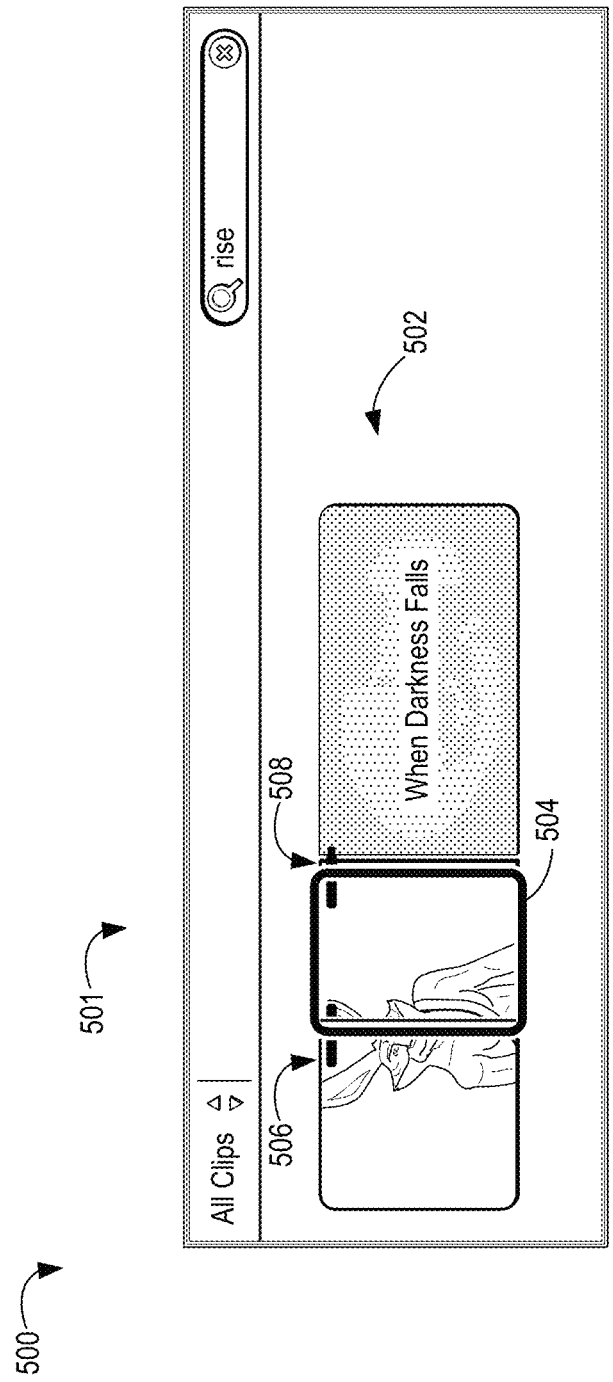

FIG. 5A shows a default view 501 presented by the user interface 500. The default view 501 presents video clips independent of whether any ranges of the video clips have been categorized. This default view 501 shows a video clip 502 that has one marked range 504 spanning two categorized ranges 506, 508, each of which is categorized as "favorite." The marked range 504 is also active (selected). The user interface 500 enables a user to hide ranges not categorized as favorite, such that only the favorite ranges are shown.

Figure 5B:
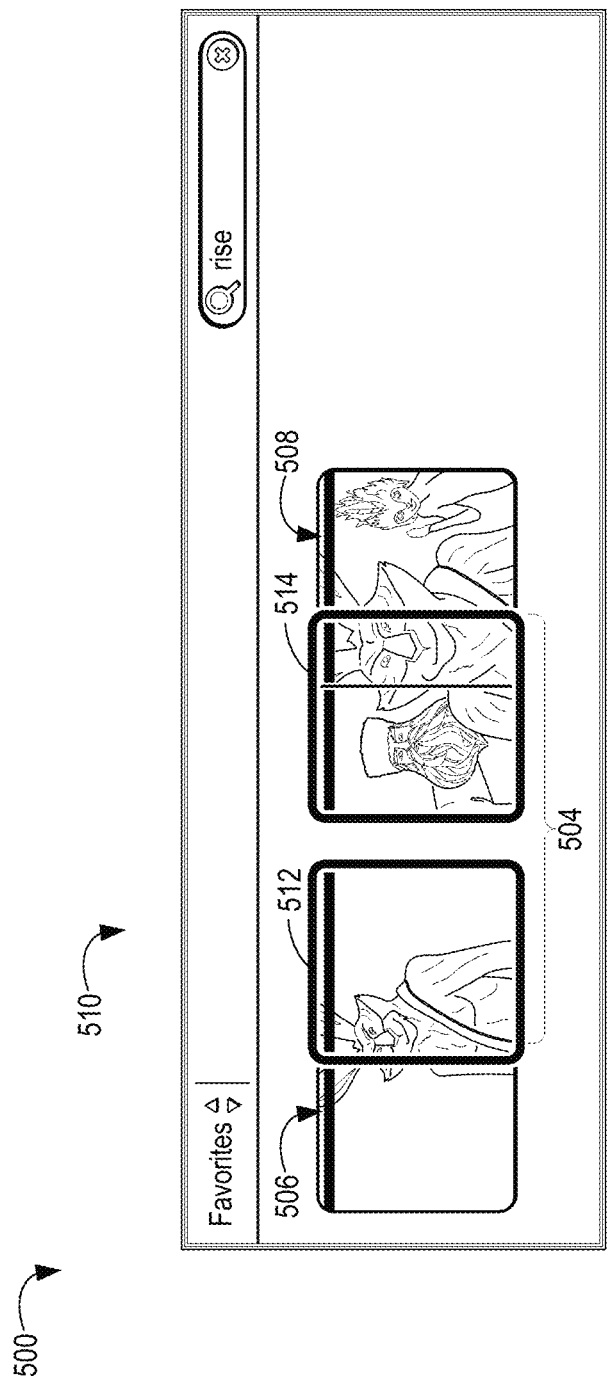

FIG. 5B shows a favorites view 510 of the user interface 500, which is displayed when the user performs an action to hide the ranges not categorized as favorite (e.g., by selecting a favorites view option in the user interface 500). Two marked ranges 512, 514 are shown. These marked ranges 512, 514 correspond to the portions of the marked range 504 that overlap the ranges 506, 508 categorized as favorite. In this way, the user interface 500 can adapt the ranges marked by the user to a current view, including dividing a marked range among multiple ranges if a portion of a marked range is no longer visible in a current view.

Figure 5C:
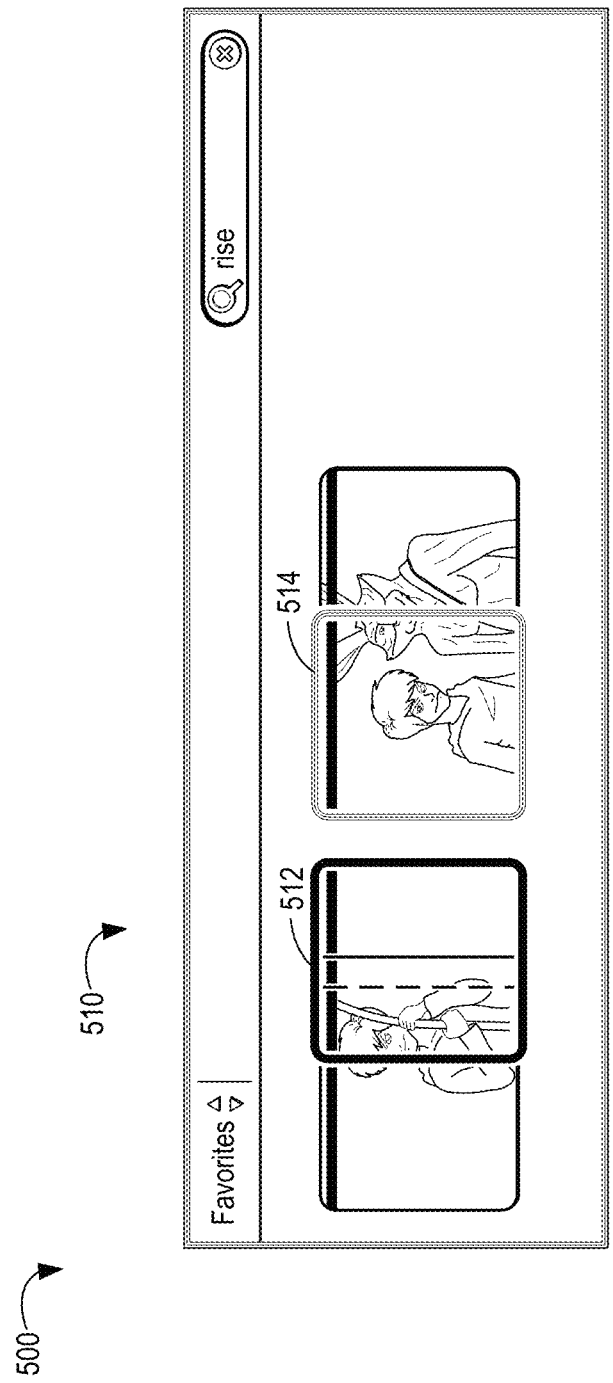

As shown in FIG. 5C, a user can deactivate (de-select) one of the marked ranges 514 shown in the favorites view 510. The user can deactivate a marked range using an input device or combination of input devices. For example, on a computer system with a mouse and a keyboard, a user might "command-click" on the marked range (hold down a "command" key on the keyboard and use the mouse to invoke a de-selection of the marked range). Other input techniques could also be used.

Figure 5D:
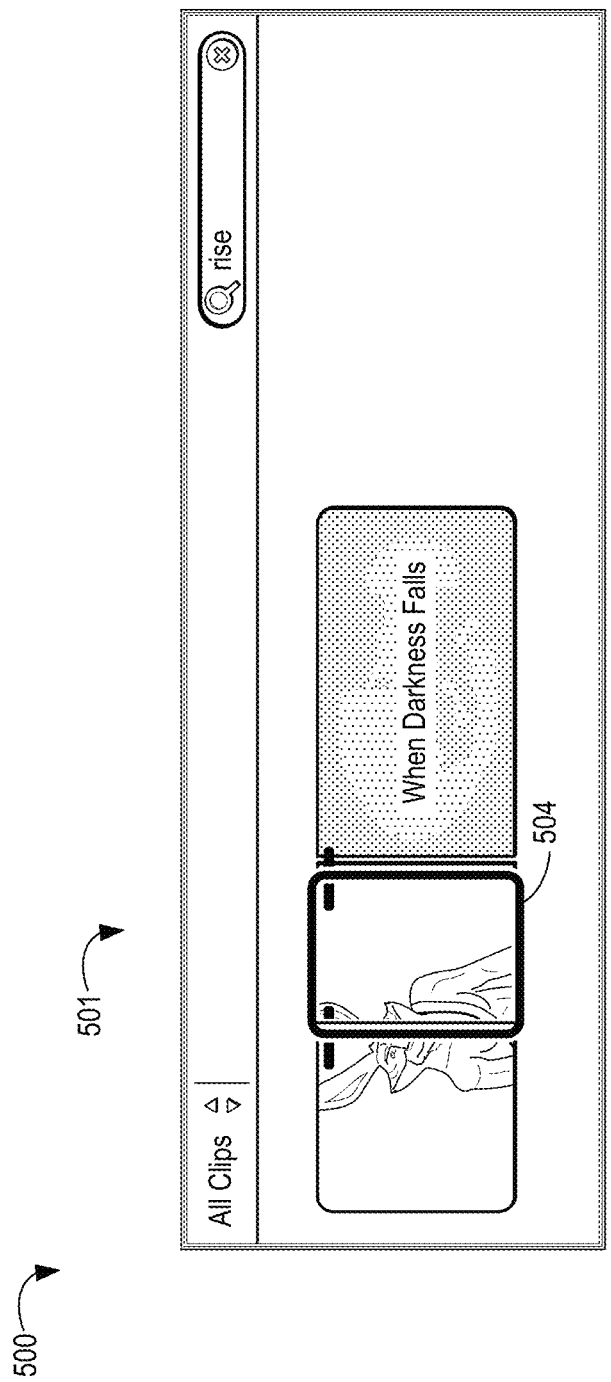

FIG. 5D shows one example of behavior of the user interface 500 when one of the marked ranges 512 is active and another of the marked ranges 514 is inactive (as shown in FIG. 5C), and the marked ranges 512, 514 formed portions of another marked range 504. As shown in FIG. 5D, the user has switched to the default view 501 originally displaying the marked range 504 spanning ranges categorized as favorite and spanning ranges not categorized as favorite. Although one marked range 514 in the favorites view 510 was deactivated in FIG. 5C, in this view 501, the entire marked range 504 is displayed as active, because a portion of the marked range 504 in the other view 510 (represented by the marked range 512 in FIG. 5C) remained active.

Figure 5E:
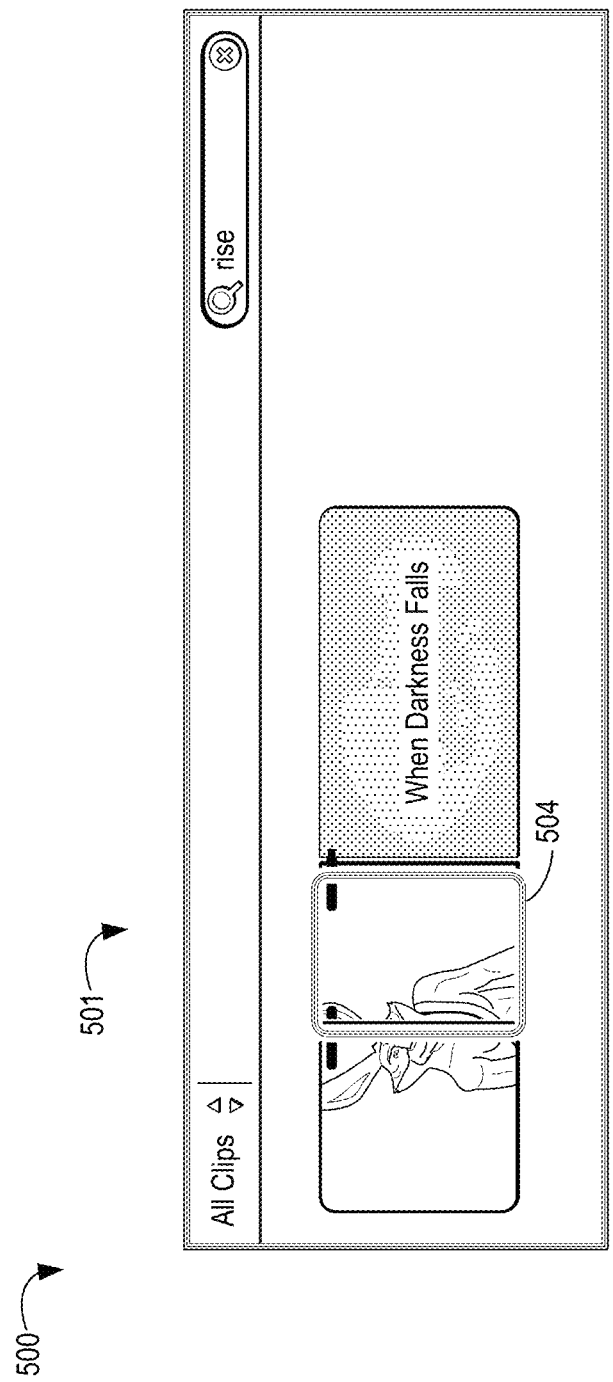

As an alternative to the scenario shown in FIG. 5C, a user could instead deactivate both marked ranges 512, 514 in the favorites view 510. As shown in FIG. 5E, if the user subsequently switches to the default view 501 displaying the marked range 504 spanning ranges categorized as favorite and spanning ranges not categorized as favorite, the marked range 504 is shown as deactivated. This behavior occurs if all of the constituent marked ranges 512, 514 were deactivated in the favorites view 510 shown in FIG. 5C.

Figure 5F:
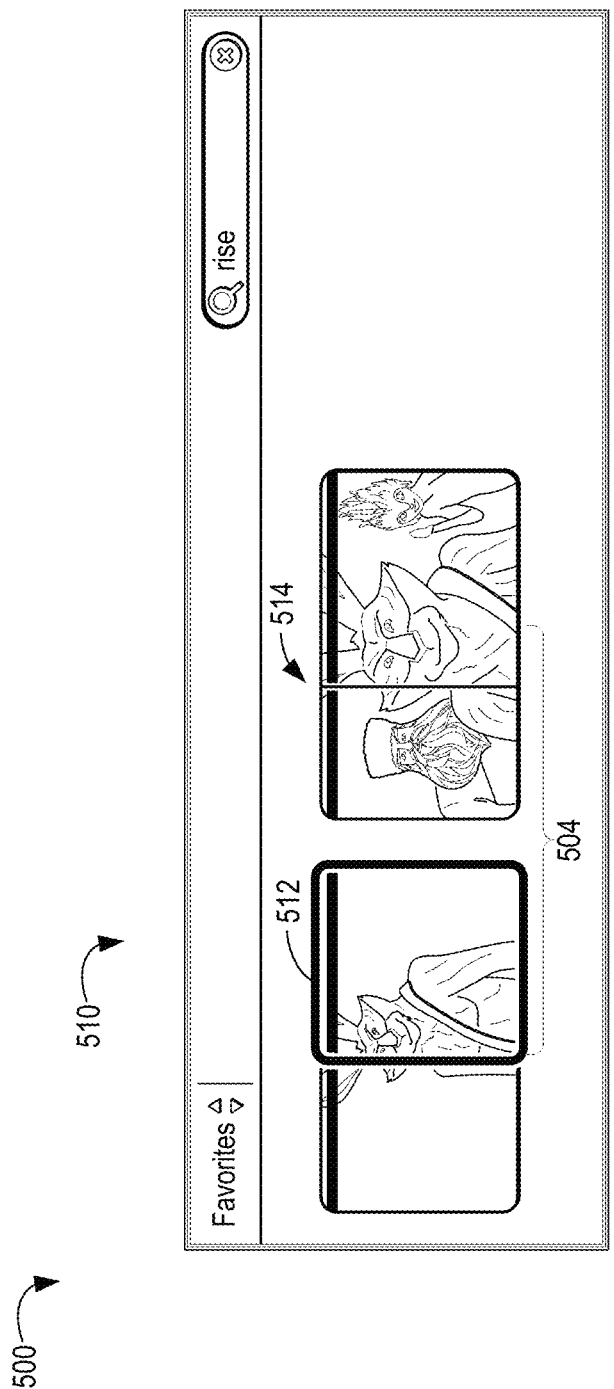

FIG. 5F shows another example of behavior of the user interface 500 when one of the marked ranges 512 is active and another of the marked ranges 514 is inactive, and the marked ranges 512, 514 formed portions of another marked range 504. In this example, rather than "command-click" on the second marked range 514 shown in the favorites view 510, the user has "option-clicked" on the second marked range 514. As a result, the second marked range 514 has been deactivated. Because the user used a different input to deactivate the second marked range 514, the status of the second marked range 514 is different from the inactive status shown in FIG. 5C. In some implementations, the second marked range 514 can be removed from the favorites view 510 entirely, to reflect the different status. In some implementations, the second marked range 514 may be deleted in response to the "option-click" input, rather than only deactivated.

Although "command-click" and "option-click" are used as examples here, any two types of input could be used, depending on the capabilities of the computer system 104 used by the user 102 (FIG. 1).

As shown in FIG. 5G, the user has switched to the view 501 originally displaying the marked range 504 spanning ranges categorized as favorite and spanning ranges not categorized as favorite. As a result of the user's actions shown in FIG. 5E, the marked range 504a shown in this view 501 has been modified. Here, the portion of the marked range 504 represented by the marked range 514 in FIG. 5C has been removed from the modified marked range 504a. In this way, the difference in user input affects the behavior of the user interface 500.

Figure 6:
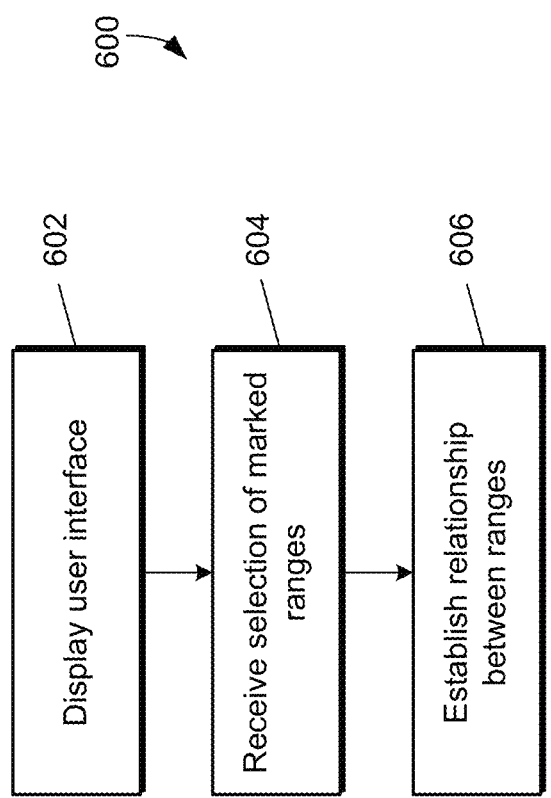
FIG. 6 is a flowchart of an example process for enabling a user to view and edit video clips.

FIG. 6 is a flowchart of an example process 600 for enabling a user to view and edit video clips. The process 600 can be performed, for example, by the computer system 104 shown in FIG. 1.

The process 600 includes displaying 602 an interface enabling a user to mark ranges in video clips presented in a user interface of a video editing application. The ranges of the video clips each represent a portion of the video content of each respective clip. At least some of the ranges of the video clips are displayed as marked simultaneously.

The process 600 includes receiving 604 a selection of multiple marked ranges of video clips. In some examples, at least some of the selected multiple ranges of video clips are portions of the same video clip. In some examples, at least some of the selected multiple ranges of video clips are portions of different video clips. In some examples, a selection of a subset of the ranges of video clips marked in the user interface can be received. For example, the subset of the ranges of video clips marked in the user interface can be displayed as active, and at least some of the ranges of video clips marked in the user interface not in the subset can be displayed as not active.

The process 600 includes establishing 606 a relationship between the selected multiple ranges of the video clips. In some examples, establishing the relationship includes saving data representing the selection. For example, the selected ranges can be assigned a category, or the selected ranges can be saved and later recalled.

In some implementations of the process 600, a first portion of a first marked range of a video clip overlaps with a first range of a video clip having an assignment to a first category in the user interface, and a second portion of the first marked range of the video clip overlaps with a second range of a video clip having an assignment to a second category in the user interface. In these implementations, a second marked range corresponding to the first portion of the first marked range of the video clip can be displayed in the user interface. This can be done in response to receiving a command to display video clips assigned to the first category. Further, subsequent to receiving a command to deactivate the second marked range corresponding to the first portion of the marked range of the video clip, a determination can be made whether to modify the first marked range of the video clip. For example, the determination can be made based on user input provided when the second marked range is deactivated.

Figure 7:
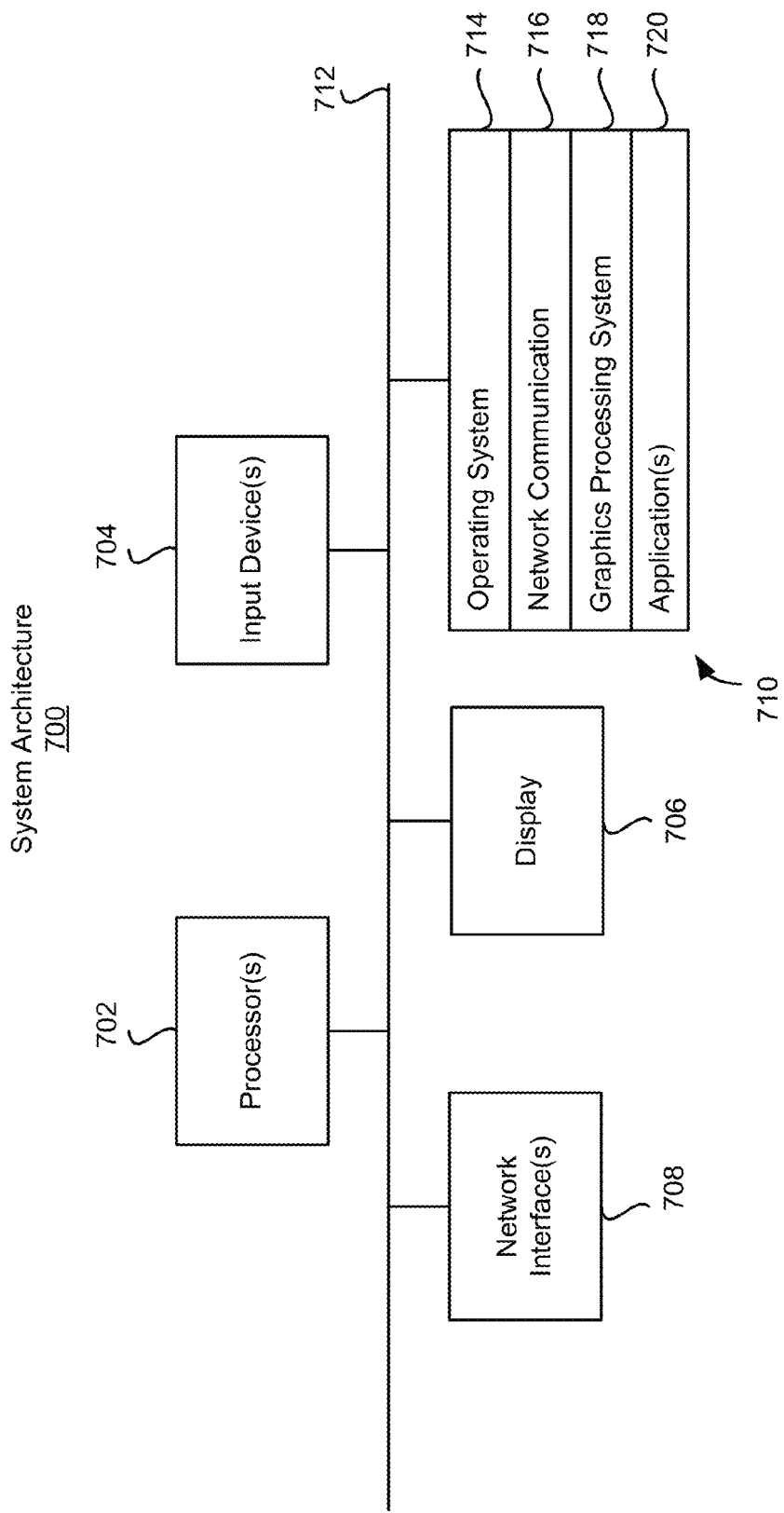
FIG. 7 is a block diagram of an exemplary system architecture implementing the features and processes of FIGS. 1-6.

FIG. 7 is a block diagram of an exemplary system architecture implementing the features and processes of FIGS. 1-6. The architecture 700 can be implemented on any electronic device that runs software applications derived from compiled instructions, including without limitation personal computers, servers, smart phones, media players, electronic tablets, game consoles, email devices, etc. In some implementations, the architecture 700 can include one or more processors 702, one or more input devices 704, one or more display devices 706, one or more network interfaces 708 and one or more computer-readable mediums 710. Each of these components can be coupled by bus 712.

Display device 706 can be any known display technology, including but not limited to display devices using Liquid Crystal Display (LCD) or Light Emitting Diode (LED) technology. Processor(s) 702 can use any known processor technology, including but are not limited to graphics processors and multi-core processors.

Input device 704 can be any known input device technology, including but not limited to a keyboard (including a virtual keyboard), mouse, track ball, and touch-sensitive pad or display. In some implementations, the input device 704 could include a microphone 530 that facilitates voice-enabled functions, such as speech-to-text, speaker recognition, voice replication, digital recording, and telephony functions. The input device 704 can be configured to facilitate processing voice commands, voiceprinting and voice authentication. In some implementations, audio recorded by the input device 704 is transmitted to an external resource for processing. For example, voice commands recorded by the input device 704 may be transmitted to a network resource such as a network server which performs voice recognition on the voice commands.

Bus 712 can be any known internal or external bus technology, including but not limited to ISA, EISA, PCI, PCI Express, NuBus, USB, Serial ATA or FireWire. Computer-readable medium 710 can be any medium that participates in providing instructions to processor(s) 702 for execution, including without limitation, non-volatile storage media (e.g., optical disks, magnetic disks, flash drives, etc.) or volatile media (e.g., SDRAM, ROM, etc.).

Computer-readable medium 710 can include various instructions 714 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 704; sending output to display device 706; keeping track of files and directories on computer-readable medium 710; controlling peripheral devices (e.g., disk drives, printers, etc.) which can be controlled directly or through an I/O controller; and managing traffic on bus 712. Network communications instructions 716 can establish and maintain network connections (e.g., software for implementing communication protocols, such as TCP/IP, HTTP, Ethernet, etc.).

A graphics processing system 718 can include instructions that provide graphics and image processing capabilities. For example, the graphics processing system 718 can implement the processes described with reference to FIGS. 1-6.

Application(s) 720 can be an application that uses or implements the processes described in reference to FIGS. 1-6. For example, the applications 720 could include the video editing application 100 shown in FIG. 1. The processes can also be implemented in operating system 714.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer.

Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:
displaying, in a user interface of a video editing application, an interface enabling a user of the video editing application to mark ranges in video clips presented in the user interface, the ranges of the video clips each representing a portion of video content of each respective clip, wherein at least one of the ranges represents a portion of video less than the total video content of the video clip associated with the range, and at least some of the ranges of the video clips being simultaneously displayed as marked;
while at least a first, second, and third marked ranges of video clips are displayed in the user interface and arranged in a first arrangement:
receiving, from the user, input designating the first and second marked ranges of the video clips displayed in the user interface as active and designating the third marked range as inactive; and
displaying, while maintaining the first arrangement in the user interface, a first instance of a first kind of user interface element indicating that the first marked range is active, a second instance of the first kind of user interface element indicating that the second marked range is active, and a first instance of a second kind of user interface element indicating that the third marked range is inactive.

2. The method of claim 1, wherein at least some of the selected ranges of video clips are portions of the same video clip.

3. The method of claim 1, wherein at least some of the selected ranges of video clips are portions of different video clips.

4. The method of claim 1, comprising establishing a relationship between the selected ranges of the video clips.

5. The method of claim 4, wherein establishing a relationship between the selected ranges of the video clips comprises at least one of saving data representing the selection or assigning a category to the selected ranges of the video clips.

6. The method of claim 1, wherein receiving, from the user, a selection of ranges of video clips comprises receiving a selection of a subset of the ranges of video clips marked in the user interface.

7. The method of claim 6, wherein the subset of the ranges of video clips marked in the user interface are displayed as active, and at least some of the ranges of video clips marked in the user interface not in the subset are displayed as not active.

8. The method of claim 1, wherein a first portion of the first marked range of a video clip overlaps with a first range of a video clip having an assignment to a first category in the user interface, and a second portion of the first marked range of the video clip overlaps with a second range of a video clip having an assignment to a second category in the user interface.

9. The method of claim 8 comprising, in response to receiving a command to display video clips assigned to the first category, displaying, in the user interface, a fourth marked range corresponding to the first portion of the first marked range of the video clip.

10. The method of claim 9, comprising, subsequent to receiving a command to deactivate the fourth marked range corresponding to the first portion of the marked range of the video clip, determining whether to modify the first marked range of the video clip.

11. The method of claim 1, comprising:
after the video editing application has been closed and opened at a later time, retrieving the stored data representing the established relationship and using the stored data to enable a user to manipulate the selected marked ranges in the video editing application.

12. The method of claim 1, wherein the range designated as inactive is displayed as deselected in the user interface.

13. The method of claim 1, wherein designating the third marked range as inactive comprises receiving, from the user, input designating the third marked range as inactive.

14. The method of claim 1, wherein designating the third marked range as inactive comprises receiving, from the user, input deselecting the third marked range.

15. The method of claim 4, wherein establishing a relationship between the selected ranges of the video clips comprises storing metadata representing the selection in a database associated with the video clips.

16. A non-transitory computer readable storage device encoded with instructions that, when executed by a computer system, cause a computer system to carry out operations comprising:
displaying, in a user interface of a video editing application, an interface enabling a user of the video editing application to mark ranges in video clips presented in the user interface, the ranges of the video clips each representing a portion of video content of each respective clip, wherein at least one of the ranges represents a portion of video less than the total video content of the video clip associated with the range, and at least some of the ranges of the video clips being simultaneously displayed as marked;
while at least a first, second, and third marked ranges of video clips are displayed in the user interface and arranged in a first arrangement:
receiving, from the user, input designating the first and second marked ranges of the video clips displayed in the user interface as active and designating the third marked range as inactive; and
displaying, while maintaining the first arrangement in the user interface, a first instance of a first kind of user interface element indicating that the first marked range is active, a second instance of the first kind of user interface element indicating that the second marked range is active, and a first instance of a second kind of user interface element indicating that the third marked range is inactive.

17. The non-transitory computer readable storage device of claim 16, wherein at least some of the selected ranges of video clips are portions of the same video clip.

18. The non-transitory computer readable storage device of claim 16, wherein at least some of the selected ranges of video clips are portions of different video clips.

19. The non-transitory computer readable storage device of claim 16, the operations comprising establishing a relationship between the selected ranges of the video clips.

20. The non-transitory computer readable storage device of claim 16, wherein establishing a relationship between the selected ranges of the video clips comprises at least one of saving data representing the selection or assigning a category to the selected ranges of the video clips.

21. The non-transitory computer readable storage device of claim 16, wherein receiving, from the user, a selection of ranges of video clips comprises receiving a selection of a subset of the ranges of video clips marked in the user interface.

22. The non-transitory computer readable storage device of claim 21, wherein the subset of the ranges of video clips marked in the user interface are displayed as active, and at least some of the ranges of video clips marked in the user interface not in the subset are displayed as not active.

23. The non-transitory computer readable storage device of claim 16, wherein the first portion of a first marked range of a video clip overlaps with a first range of a video clip having an assignment to a first category in the user interface, and a second portion of the first marked range of the video clip overlaps with a second range of a video clip having an assignment to a second category in the user interface.

24. The non-transitory computer readable storage device of claim 23, the operations comprising, in response to receiving a command to display video clips assigned to the first category, displaying, in the user interface, a fourth marked range corresponding to the first portion of the first marked range of the video clip.

25. The non-transitory computer readable storage device of claim 24, the operations comprising, subsequent to receiving a command to deactivate the fourth marked range corresponding to the first portion of the marked range of the video clip, determining whether to modify the first marked range of the video clip.

* * * * *